United States Patent
Salter et al.

(10) Patent No.: US 10,784,745 B2
(45) Date of Patent: Sep. 22, 2020

(54) STATORS FOR ELECTRICAL MACHINES

(71) Applicant: GE Energy Power Conversion Technology Ltd, Rugby, Warwickshire (GB)

(72) Inventors: Benjamin Guy Salter, Rugby (GB); Joseph Christy Eugene, Rugby (GB); Graham Derek Le Flem, Rugby (GB)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 272 days.

(21) Appl. No.: 15/094,093

(22) Filed: Apr. 8, 2016

(65) Prior Publication Data
US 2016/0301286 A1    Oct. 13, 2016

(30) Foreign Application Priority Data

Apr. 9, 2015    (EP) .................................. 15162941

(51) Int. Cl.
*H02K 9/00*    (2006.01)
*H02K 1/20*    (2006.01)
(Continued)

(52) U.S. Cl.
CPC .............. *H02K 9/005* (2013.01); *H02K 1/14* (2013.01); *H02K 1/165* (2013.01); *H02K 1/20* (2013.01);
(Continued)

(58) Field of Classification Search
CPC ............ H02K 1/14; H02K 1/165; H02K 1/20; H02K 3/48; H02K 5/18; H02K 9/005; H02K 9/10; H02K 9/19
(Continued)

(56) References Cited

U.S. PATENT DOCUMENTS

| 6,954,010 B2 * | 10/2005 | Rippel | ..................... H02K 1/20 310/216.014 |
| 7,851,966 B2 * | 12/2010 | Rippel | ..................... H02K 3/34 310/215 |

(Continued)

FOREIGN PATENT DOCUMENTS

| DE | 19939598 A1 | 3/2001 |
| EP | 2124322 A2 | 11/2009 |
| EP | 2518868 A1 | 10/2012 |
| EP | 2806537 A2 | 11/2014 |
| NO | 2003094323 A1 | 11/2003 |

OTHER PUBLICATIONS

EP Search Report issued in connection with corresponding EP application EP15162941.7 dated Oct. 5, 2015.

*Primary Examiner* — Alex W Mok
(74) *Attorney, Agent, or Firm* — Wood IP LLC

(57) ABSTRACT

A stator for an electrical machine (e.g., a motor or generator) is described. The stator includes a stator core consisting of a plurality of axially adjacent generally annular laminations. The stator has axially extending stator teeth between adjacent pairs of which are formed axially extending stator slots for receiving conductors of a stator winding. At least one of the stator teeth includes an axially extending cooling passageway through which a cooling fluid flows in use. The electrical machine can include means for circulating cooling fluid through the cooling passageway(s) to cool the stacked laminations and means for circulating air around the stator along an air cooling circuit where the circulated air is cooled by the stator laminations and there is no need for a separate heat exchanger.

18 Claims, 8 Drawing Sheets

(51) Int. Cl.
*H02K 3/48* (2006.01)
*H02K 5/18* (2006.01)
*H02K 1/14* (2006.01)
*H02K 1/16* (2006.01)
*H02K 9/19* (2006.01)
*H02K 9/10* (2006.01)

(52) U.S. Cl.
CPC ............ *H02K 3/48* (2013.01); *H02K 5/18* (2013.01); *H02K 9/10* (2013.01); *H02K 9/19* (2013.01)

(58) Field of Classification Search
USPC .......................................................... 310/59
See application file for complete search history.

(56) References Cited

U.S. PATENT DOCUMENTS

| | | | |
|---|---|---|---|
| 8,201,316 B2* | 6/2012 | Rippel | H02K 1/20 29/402.02 |
| 8,247,933 B2* | 8/2012 | Dang | H02K 1/20 310/54 |
| 8,482,167 B2* | 7/2013 | Erfanfar | B60K 6/40 310/52 |
| 2014/0346778 A1* | 11/2014 | Arlab N Gabeiras | H02K 9/197 290/55 |
| 2015/0035393 A1* | 2/2015 | Rippel | H02K 1/20 310/54 |
| 2015/0069867 A1* | 3/2015 | Thiot | H02K 1/20 310/59 |

\* cited by examiner

STATORS FOR ELECTRICAL MACHINES

BACKGROUND

Embodiments of the present invention relate to stators for electrical machines (e.g., motors and generators), and in particular to stators that have cooling passageways or ducts. Embodiments of the present invention can be particularly useful for high-power, low-speed electrical machines.

DESCRIPTION OF RELATED ART

It is known to produce laminated stators for electrical machines by pressing stacks of annular laminations together. The laminations are typically formed from sheets of electrical grade steel which are usually provided with insulating coatings. Each annular lamination may be formed of a single member or may itself be of segmental construction with the segments abutted against each other e.g., at generally radially extending edges.

The laminations can define axially extending teeth that define therebetween axially extending slots for receiving the conductors of a stator winding. The teeth are circumferentially spaced around the stator surface and carry the magnetic flux that links from the stator to the rotor across the airgap. The conductors are electrically insulated from the teeth.

One of the problems faced by designers of electrical machines is the heat that is created as a result of the various losses, e.g., resistive losses in the stator winding, eddy current losses in the laminations etc. The problem of heat can be particularly acute when trying to design an electrical machine with high power density. The maximum power output of an electrical machine, for a given amount of conductive material (e.g., copper for the stator winding conductors and iron for the magnetic circuit) is limited by the efficiency of the cooling because, if heat is not removed efficiently, the temperature of the electrical machine will increase to a point that can cause the insulation material or some other part of the machine to fail.

One of the main sources of heat in a low-speed electrical machine is typically the result of the resistive losses in the stator winding conductors that are received in the slots and which have endwindings that extend outwardly beyond the axial ends of the stator.

Electrical machines can be cooled in a variety of different ways, e.g., direct liquid or air cooling, cooling by conduction to the laminations which are in turn cooled by direct cooling or an external water jacket. However, all of these known ways of cooling suffer from some disadvantages in terms of their available power density, mechanical complexity, or noise.

There is therefore a need for an improved way of cooling an electrical machine that combines good cooling efficiency, mechanical simplicity and low noise.

SUMMARY OF THE INVENTION

Embodiments of the present invention provide a stator for an electrical machine, the stator comprising a plurality of axially adjacent generally annular laminations (e.g. defining a stator core), the stator having axially extending stator teeth between adjacent pairs of which are formed axially extending stator slots for receiving conductors of a stator winding, at least one of the stator teeth including an axially extending cooling passageway (or duct) through which a cooling fluid flows in use. More particularly, each stator tooth will include at least one axially extending cooling passageway so that cooling passageways are provided around the circumference of the stator.

Each stator tooth can have two or more axially extending cooling passageways (or ducts). Two or more cooling passageways might typically be used in preference to a single, larger, cooling passageway if this gives the stator tooth improved mechanical properties such as strength and/or rigidity.

In an embodiment, each lamination may include slots therein defining the stator slots, and teeth defining the stator teeth when the laminations are stacked together. Each lamination tooth can have at least one opening therein defining an axially extending void when the laminations are stacked together. In one arrangement, each void defines a corresponding cooling passageway for the cooling fluid. In another arrangement, a tube of non-electrically conductive material can be positioned within each void such that each cooling passageway is defined by a corresponding tube. Each lamination opening can have any suitable shape or size. Each tube can have any suitable cross-section. Each lamination can have the form of a segment of an annulus, or can itself be formed from a plurality of segmental members, more particularly abutting one another along generally radially extending edges. In an embodiment, lamination segment boundaries are aligned with stator slots, not with stator teeth.

The stator can further include axially extending cooling fins. In an embodiment, each lamination has projections defining the cooling fins. It will be readily appreciated that other cooling fin configurations (e.g., non-axial) can be used. The cooling fins can be provided on a radially outer surface of the stator if the stator teeth are provided on a radially inner surface of the stator or vice versa. The cooling fins increase the area of the stator core in contact with cooling air which forms part of an air cooling circuit that is described in more detail below, and hence improve cooling efficiency. The cooling fins can have any suitable shape for optimal cooling.

In an embodiment, each cooling passageway extends along the full length of the stacked laminations (or stator core). But in some configurations, each cooling passageway can extend along just part of the stacked laminations.

When the stacked laminations are compressed and subjected to appropriate treatment including vacuum pressure impregnation (VPI) and curing, each cooling passageway may be made fluid tight. In one arrangement, the surface of each cooling passageway is defined by the lamination openings such that the cooling fluid is in direct contact with the stacked laminations. An arrangement where each cooling passageway is defined by a tube positioned within each void might not have such efficient heat transfer between the stacked laminations and the cooling fluid, but it has the potential advantage that it does not rely on the axially extending voids themselves being fluid tight. With either arrangement, there is no direct contact between the cooling fluid and the stator winding conductors. In an embodiment, a manifold is provided at each axial end of the stacked laminations—see below. More particularly, the manifolds are also subjected to the VPI and curing process and provide a fluid tight seal around the end of each cooling passageway.

External conduits or other pipework can be subsequently connected to manifold connection points to allow cooling fluid to be circulated around at least one closed-loop cooling circuit. The external conduits or other pipework can be part of an external cooling assembly. If it provides additional useful cooling, the external conduits or other pipework can be routed adjacent at least one of the endwindings of the stator winding.

The stator can further include a first manifold at a first axial end of the stator and a second manifold at a second axial end of the stator. The first manifold can have at least one inlet in fluid communication with a source of cooling fluid and outlets in fluid communication with a first axial end of the cooling passageways. The second manifold can have at least one outlet and inlets in fluid communication with a second axial end of the cooling passageways. The first manifold distributes cooling fluid from the inlet(s) to the cooling passageways and the second manifold collects cooling fluid from the cooling passageways and supplied it to the outlet(s). The first and second manifolds can have any suitable construction, including a segmented construction where each manifold is formed by a plurality of manifold segments. The manifold segments can be arranged to define substantially annular manifolds. In larger diameter stators, the use of manifold segments can ensure that the first and second manifolds do not cross lamination segment boundaries. The fluid dynamics of each manifold segment can also be accurately determined, which avoids the need for extensive modelling for differently sized stators if the manifolds are constructed using an appropriate number of individual manifold sections.

Each manifold segment of the first manifold can include its own inlet and each manifold segment of the second manifold can include its own outlet.

Each manifold or manifold segment will typically include an internal chamber that is in fluid communication with an inlet or outlet and which includes radially extending parts that are aligned with the stator teeth and which distribute the cooling fluid to the cooling passageways or collect cooling fluid from the cooling passageways. In one arrangement, typically for smaller diameter stators with non-segmented laminations, the first and second manifolds are non-segmented and the internal chamber can be substantially annular. The inlet of the first manifold and the outlet of the second manifold can be fluidly connected to an external cooling assembly to define, with the cooling passageways, a closed-loop cooling circuit. The external cooling assembly can optionally include two or more external cooling circuits fluidly connected to the inlet and outlet in parallel to provide redundancy, for example.

In another arrangement, where the first and second manifolds are segmented, it will be readily appreciated that a wide variety of external cooling circuit options are available. For example, the inlets of the manifold segments of the first manifold can be fluidly connected to a common inlet, either in series or parallel, and the outlets of the manifold segments of the second manifold can be fluidly connected to a common outlet, either in series or parallel. The common inlet and the common outlet can then be fluidly connected to an external cooling assembly to define, with the internal cooling passageways, a closed-loop cooling circuit. The external cooling assembly can optionally include two or more external cooling circuits fluidly connected to the common inlet and common outlet in parallel to provide redundancy, for example.

Alternatively, the inlets of a first group of the manifold segments of the first manifold can be fluidly connected to a first common inlet, either in series or parallel, the inlets of a second group of the manifold segments of the first manifold can be fluidly connected to a second common inlet, either in series of parallel, and so on. Similarly, the outlets of a first group of the manifold segments of the second manifold can be fluidly connected to a first common outlet, either in series or parallel, the outlets of a second group of the manifold segments of the second manifold can be fluidly connected to a second common outlet, either in series or parallel, and so on. The first common inlet and the first common outlet can then be fluidly connected to a first external cooling circuit to define, with the cooling passageways associated with the first group of manifold segments, a first closed-loop cooling circuit; the second common inlet and the second common outlet can then be fluidly connected to a second external cooling circuit to define, with the cooling passageways associated with the second group of manifold segments, a second closed-loop cooling circuit; and so on. The manifold segments can be divided into any suitable number of groups and the external cooling assembly can include any suitable number of external cooling circuits. Two or more external cooling circuits can optionally be fluidly connected to each common inlet and common outlet to provide redundancy, for example. The manifold segments making up each group would not have to be physically adjacent, but can be distributed around the circumference of the stator. For example, if the first manifold includes sixteen manifold segments and the second manifold includes sixteen manifold segments, these could be fluidly connected together in two completely separate closed-loop cooling circuits with the eight inlets of the even numbered manifold segments of the first manifold (i.e., as numbered consecutively around the circumference of the stator) being fluidly connected to a first common inlet, the eight inlets of the odd numbered manifold segments of the first manifold being fluidly connected to a second common inlet, the eight outlets of the even numbered manifold segments of the second manifold being fluidly connected to a first common outlet, and the eight outlets of the odd numbered manifold segments of the second manifold being fluidly connected to a second common outlet. The first common inlet and first common outlet can be fluidly connected to a first external cooling circuit and the second common inlet and second common outlet can be fluidly connected to a second external cooling circuit. The first external cooling circuit defines a first closed-loop cooling circuit with the cooling passageways associated with the even numbered manifold segments and the second external cooling circuit defines a second closed-loop cooling circuit with the cooling passageways associated with the odd numbered manifold segments. It will be readily understood that, in the event of a fault on the first external cooling circuit, cooling fluid could still be circulated through the cooling passageways associated with the odd numbered manifold segments so that cooling is distributed around the circumference of the stator. The sixteen manifolds segments could also be evenly divided into four groups, for example, as appropriate. The groups need not have the same number of manifold segments. Thus, the sixteen manifold segments, could also be divided into three groups, for example, with first and second groups having five manifold segments and a third group having six manifold segments.

Alternatively, the inlet of a first manifold segment of the first manifold and the outlet of a first manifold segment of the second manifold can be fluidly connected to a first external cooling circuit to define, with the cooling passageways associated with the first manifold segments, a first closed-loop cooling circuit; the inlet of a second manifold segment of the first manifold and the outlet of a second manifold segment of the second manifold can be fluidly connected to a second external cooling circuit to define, with the cooling passageways associated with the second manifold segments, a second closed-loop cooling circuit; the inlet of a third manifold segment of the first manifold and the outlet of a third manifold segment of the second manifold can be fluidly connected to a third external cooling circuit to define, with the cooling passageways associated with the third manifold segments, a third closed-loop cooling circuit; and so on. In other words, each manifold segment of the first manifold can be fluidly connected to a corresponding manifold segment of the second manifold by one or more external cooling circuits of the external cooling assembly.

Each external cooling circuit can include at least one pump for providing circulation pressure and at least one heat exchanger or similar device for cooling the cooling fluid. Each pump can be of any suitable type, and may be depend upon the type of cooling fluid that is being used. Similarly, each heat exchanger can be of any suitable type. The term 'heat exchanger' should be taken to include any device that extracts heat from the cooling fluid passing through the external cooling circuit. Each external cooling circuit can include other components, e.g., for treating, purifying or conditioning the cooling fluid, for monitoring or control etc.

Cooling fluid can be circulated through the cooling passageways in the same direction. Alternatively, cooling fluid can be circulated through some cooling passageways in one direction and cooling fluid can be circulated through other cooling passageways in an opposite direction.

Any suitable cooling fluid can be used, including air or other suitable gas, a gas/liquid mixture (e.g., a vapour), or a suitable liquid such as water, purified water, liquid dielectric or oil. The choice of cooling fluid will typically take into account concerns such as corrosion, electrical losses etc. If necessary, the external cooling circuit could include a treatment unit (e.g., for purifying or treating the cooling fluid) or a suitable additive could be added to the cooling fluid.

The stator can further include first and second compression plates.

The first manifold can be positioned between the first compression plate and a first axial end of the stacked laminations and the second manifold can be positioned between the second compression plate and a second axial end of the stacked laminations. In another arrangement, the manifolds and compression plates can be integrally formed or combined into a single component that fulfils both technical functions.

The first manifold can include one or more supports for transferring the compressive forces between the first compression plate and the first axial end of the stacked laminations. Similarly, the second manifold can include one or more supports for transferring the compressive forces between the second compression plate and the second axial end of the stacked laminations. The first and second manifolds can extend between the stator teeth and the adjacent compression plate. In this case, it will be readily appreciated that the first and second manifolds replace the conventional teeth supports that are normally located between the compression plates and the axial ends of the stacked laminations. The supports can be located in the internal chamber of each manifold or manifold segment, and optionally in the radially inwardly extending parts of the internal chamber.

The first and second manifolds can be welded or otherwise secured to the axial ends of the stacked laminations, e.g., to the adjacent end laminations. Additionally or alternatively, sealing means can be provided between the first and second manifolds and the adjacent end laminations to prevent leakage of coolant fluid. The sealing means can include seals, gaskets or sealing features provided on one or both of the first and second manifolds and the end laminations, for example.

The first and second manifolds can be formed in any suitable way, e.g., by fabrication, by casting or by machining the internal chamber into a block of material.

Embodiments of the present invention can further provide an electrical machine comprising a stator as described herein, and means (e.g., an external cooling assembly) for circulating cooling fluid through the cooling passageway(s). The external cooling assembly defines a source of cooling fluid. The stator can comprises a first manifold at a first axial end of the stator in fluid communication with a first axial end of the cooling passageways, and a second manifold at a second axial end of the stator in fluid communication with a second axial end of the cooling passageways. The means for circulating cooling fluid can be an external cooling assembly having one or more external cooling circuits fluidly connected between the first and second manifolds. The external cooling assembly can include at least one pump and at least one heat exchanger.

The stator can further include a stator winding with a plurality of first endwindings at a first axial end of the stator and a plurality of second endwindings at a second axial end of the stator, the conductors of the stator winding being received in the stator slots.

The electrical machine can further include means for circulating air around the outside of the stator. The air can be circulated around an air cooling circuit that extends along one of the radially inner or outer surface of the stator (e.g., past the stator teeth), the first endwindings, the other of the radially inner and outer surface of the stator (e.g., past the cooling fins), and the second endwindings.

Embodiments of the present invention can further provide a method of cooling an electrical machine comprising a stator having a plurality of axially adjacent generally annular laminations, the stator having axially extending stator teeth between adjacent pairs of which are formed axially extending stator slots for receiving conductors of a stator winding, at least one of the stator teeth including an axially extending cooling passageway; wherein the method comprises the step of causing a cooling fluid to flow through the cooling passageway to cool the stator.

If each of the stator teeth include an axially extending cooling passageway, the method can further include the step of causing the cooling fluid to flow through each cooling passageway to cool the stator.

The method can further include the step of circulating air around the outside of the stator, more particularly around an air cooling circuit that extends past or along one of the radially inner or outer surface of the stator (e.g., past the stator teeth), the first endwindings, the other of the radially inner and outer surface of the stator, and the second endwindings. The air circulated around the stator is may be cooled by the stacked laminations. This can avoid the need for a separate heat exchanger to cool the cooling air. In one arrangement, the stator can further include cooling fins at the other of the radially inner and outer surface of the stator, such that the air circulated around the air cooling circuit is cooled by the cooling fins.

The cooling fluid flowing through the cooling passageways is in close physical proximity to the stator winding conductors, which are the main source of heat within the electrical machine. Embodiments of the present invention therefore provide highly efficient cooling whilst avoiding mechanical complexity associated with conventional cooling methods. The cooling can also be done quietly (i.e., with low acoustic signature) because the cooling fluid can flow through the cooling passageways in the stator teeth at relatively low velocity (e.g., between about 0.1 m/s and about 0.5 m/s where the cooling fluid is water, but it will be understood that higher velocities may be needed if the cooling fluid is a gas or a gas/liquid mixture). This avoids problems such as turbulence that are common in air-cooled electrical machines, for example. The cooling fluid keeps the stator winding conductors cool and a significant proportion of heat in the endwindings that overhang the axial ends of the stator can be removed by conduction back into the stator slots. This in turn means that a relatively low air flow (e.g., about 5 m/s) is needed for the air cooling circuit to cool the endwindings. In one particular arrangement, the cooling air can flow over one set of endwindings to cool them, past the stator teeth through the airgap that is provided between the stator and the rotor, thereby cooling the rotor, and over the other set of endwindings to cool them. The air can then return to complete the air cooling circuit by flowing along the other side of the stator where it can be cooled by the cooling fins. It will therefore be readily appreciated that the air is cooled by the stacked laminations, which in turn are cooled by the cooling fluid that flows through the cooling passageways in the stator teeth.

The cooling air can be made to circulate around the air cooling circuit by one or more impellers (optionally mounted on the rotor shaft of the electrical machine) or motorised fans, for example.

The air cooling circuit can be a closed-loop circuit, i.e., where the air is circulated around the stator within an outer housing of the electrical machine. Baffles can be used to control and direct the circulation of the air around the air cooling circuit.

Embodiments of the present invention are particularly desirable for electrical machines that must have a high power density and/or a low acoustic signature, e.g., for marine applications or where the installation space for the electrical machine is restricted. The mechanical simplicity of the proposed cooling passageway(s) and the closed-loop air cooling circuit provides benefits in terms of manufacturing and maintenance costs. It is also an inherently robust design that is capable of withstanding significant external vibration and shock loads.

DETAILED DESCRIPTION

Figure 1:
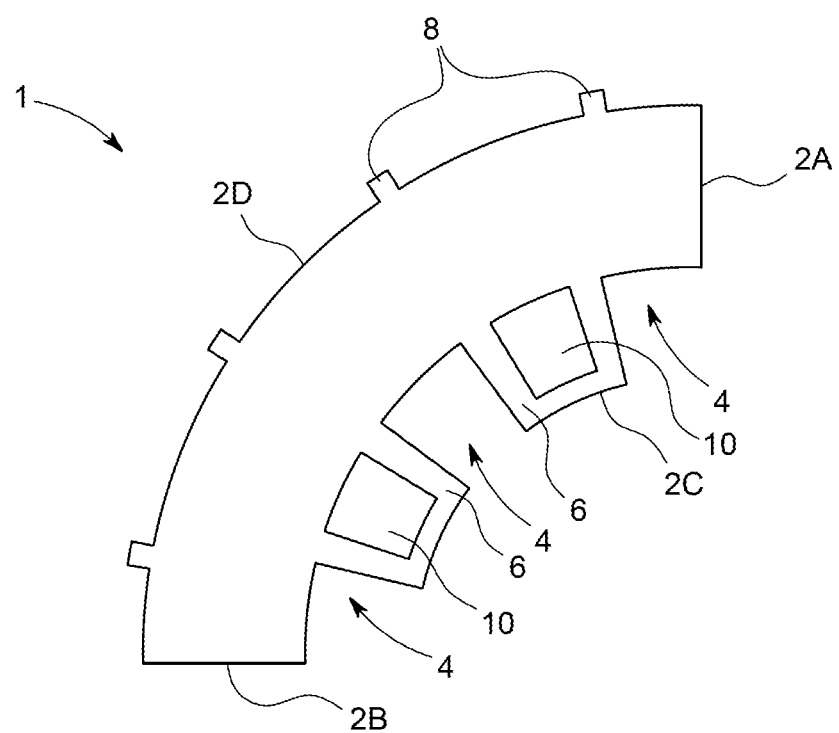
FIG. 1 is a lamination segment of a stator according to various aspects described herein.

FIG. 1 shows a lamination segment 1 that is formed from a sheet of electrical grade steel with insulating coatings. A plurality of lamination segments 1 will be abutted against each other along the radially extending edges 2A, 2B to form an annular lamination, and stacks of annular laminations are then pressed together to form a stator core. The lamination segments 1 are staggered to give tangential stiffness. The lamination segment includes slots 4 and teeth 6 in a radially inner edge 2C and projections 8 in a radially outer edge 2D. An opening 10 is formed in each tooth 6. For smaller diameter stators, non-segmented annular laminations (not shown) can be pressed together to form the stator core. Each annular lamination includes corresponding slots and teeth in a radially inner edge and corresponding projections in a radially outer edge.

Figure 2:
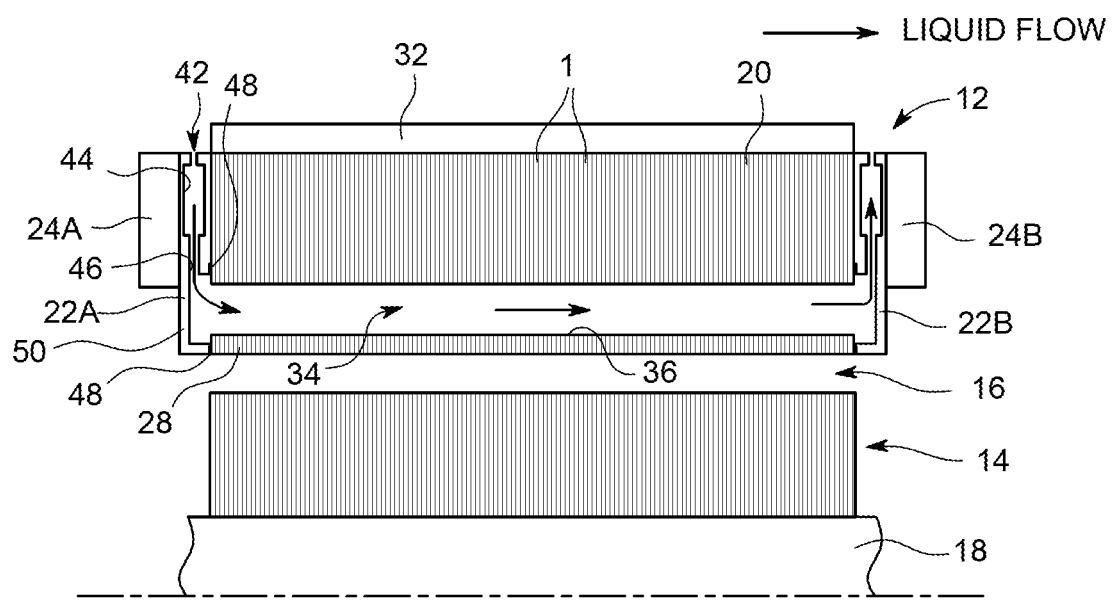
FIG. 2 is an axial cross section through an electrical machine according to various aspects described herein.

With reference to FIG. 2, an electrical machine includes a stator 12 and a rotor 14 separated by an airgap 16. The rotor 14 is mounted on a shaft 18.

The stator 12 includes a stator core 20, a first manifold 22A, a second manifold 22B, a first compression plate 24A and a second compression plate 24B.

Figure 3:
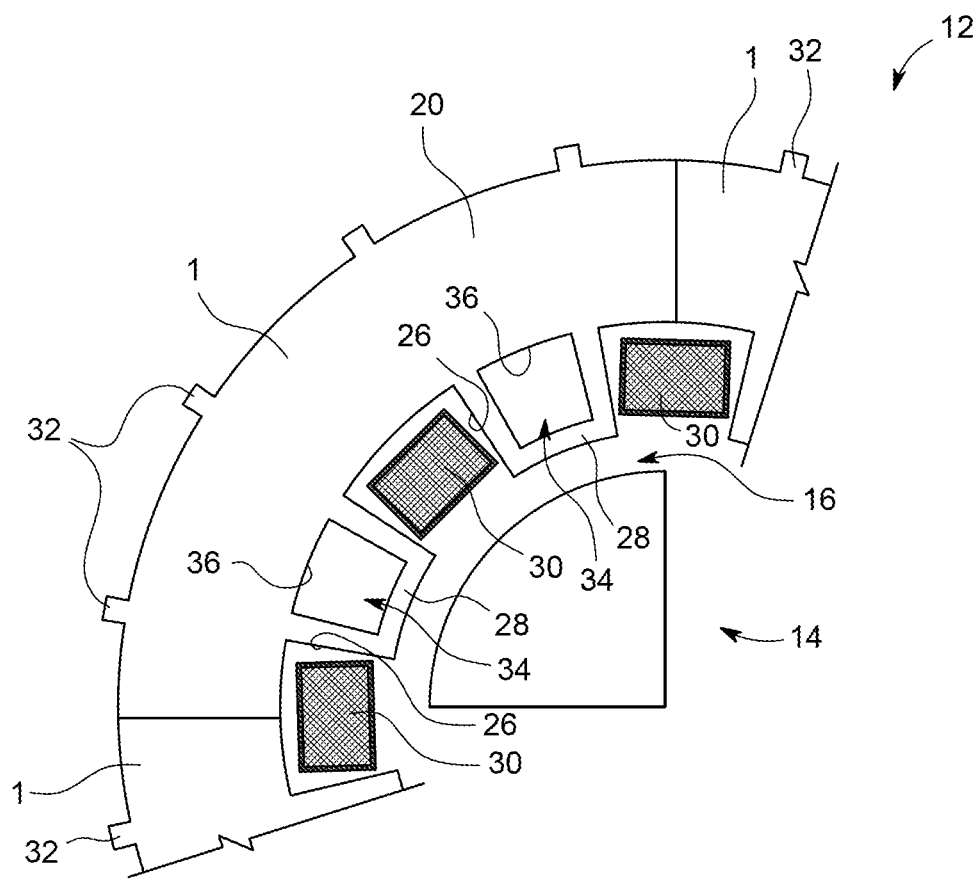
FIG. 3 is a partial radial cross section through the electrical machine of FIG. 2.

The stator core 20 is formed from the annular stacked laminations 1. With reference to FIGS. 2 and 3, the radially inner surface of the stator core 20 includes a plurality of axially extending stator slots 26 that are defined by the slots 4 of the laminations and a plurality of axially extending stator teeth 28 that are defined by the teeth 6 of the laminations. The conductors 30 of a stator winding are received in the stator slots 26. (Note that in FIGS. 2 and 4 the endwindings of the stator winding have been omitted for clarity.) The radially outer surface of the stator core 20 includes a plurality of axially extending cooling fins 32.

The stator core 20 includes a plurality of axially extending voids 34 that are defined by the openings 10 of the laminations. Each void 34 extends through a stator tooth 28 and defines a cooling passageway 36 through which a cooling liquid (e.g., water) flows during operation of the electrical machine. The cooling liquid flowing through the cooling passageways 36 is therefore in direct contact with the stacked laminations 1 of the stator core 20. When the stacked laminations 1 are compressed and subjected to appropriate treatment, including vacuum pressure impregnation (VPI) and curing, the surface of each cooling passageway 36 in an embodiment is made liquid tight.

Figure 4:
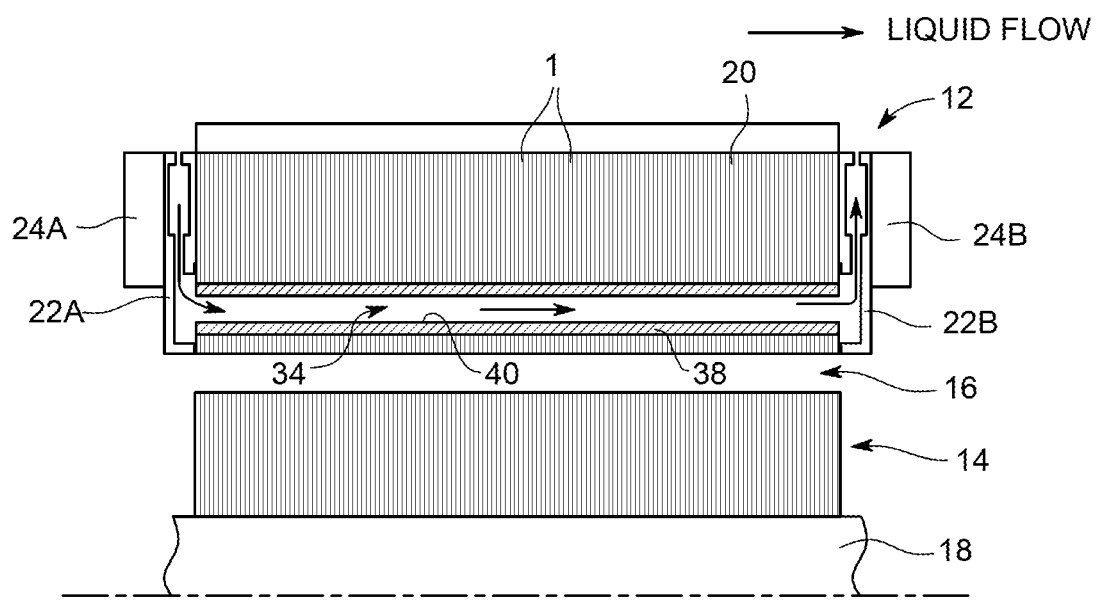
FIG. 4 is an axial cross section through an alternative electrical machine according to various aspects described herein.
Figure 5:
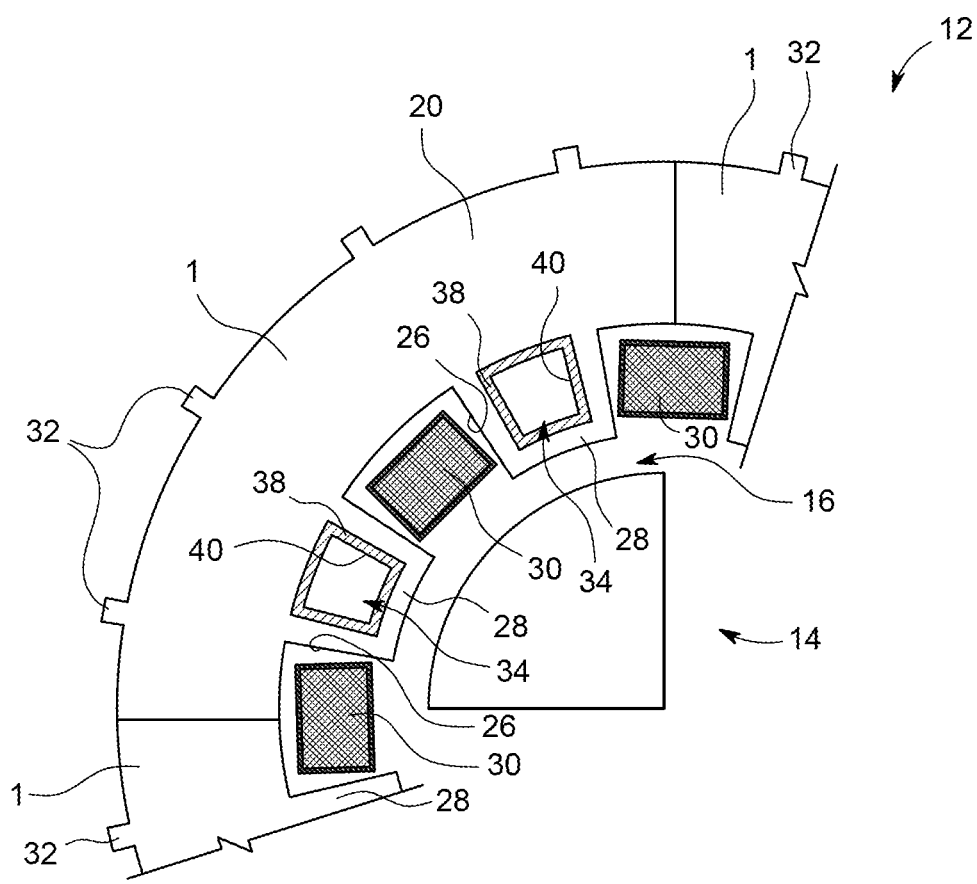
FIG. 5 is a partial radial cross section through the electrical machine of FIG. 4.

In the alternative electrical machine shown in FIGS. 4 and 5, a tube 38 of electrically non-conductive material is located in each void 34 and defines a cooling passageway 40. The alternative electrical machine is broadly similar to the electrical machine shown in FIGS. 2 and 3 and the same components have been given the same reference signs. In the alternative electrical machine, the cooling liquid is not in direct contact with the stacked laminations 1 of the stator core 20. But the tube 38 provides a liquid tight passageway 40.

Figure 6:
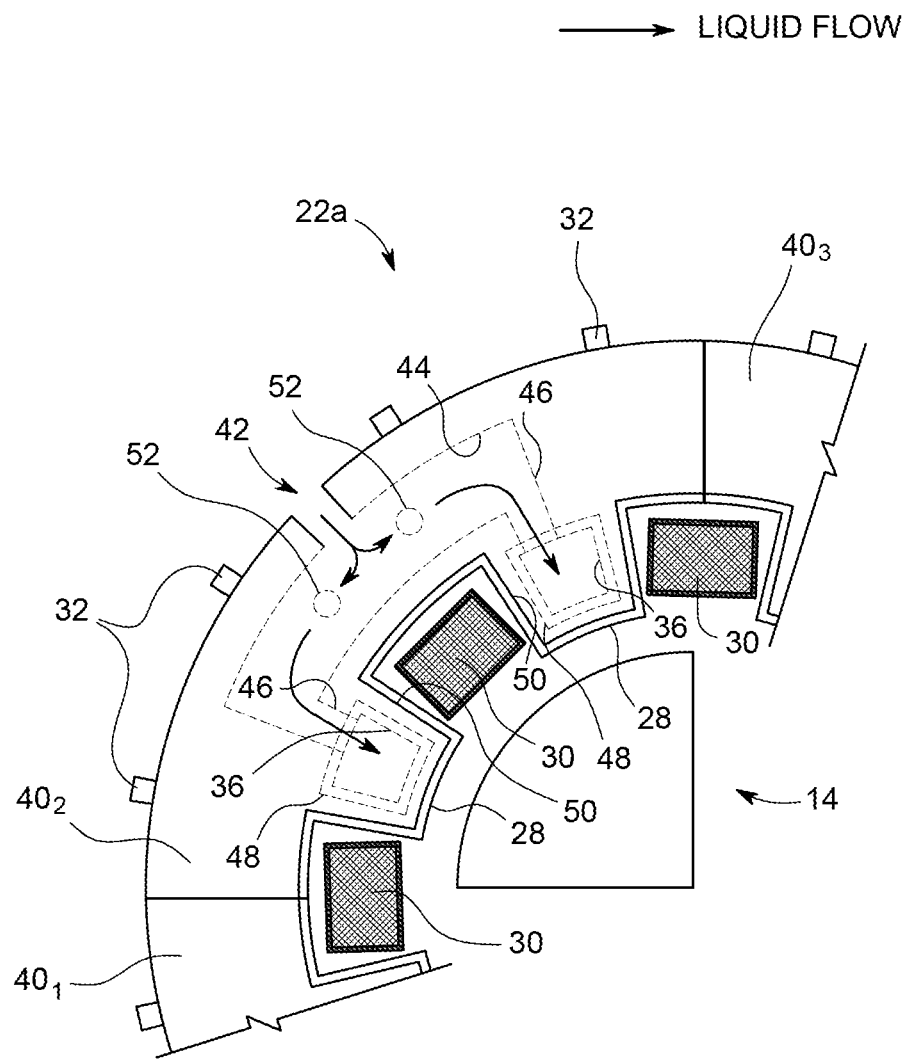
FIG. 6 is a radial view of the electrical machine of FIG. 2 showing the first manifold and with the compression plate omitted.

With reference to FIG. 6, the first manifold 22A is formed from a plurality of manifold segments $40_1$-$40_4$. In this arrangement, the first manifold 22A is formed from four manifold segments, but only three segments are shown.

Each manifold segment 40 distributes cooling liquid to two circumferentially adjacent cooling passageways 36. But it will be readily appreciated that other constructions are possible. Each manifold segment 40 includes an inlet 42 in liquid communication with an internal chamber 44. The internal chamber 44 includes radially inwardly extending parts 46 that are in liquid communication with the cooling passageways 36 and define outlets of the manifold segment 40. Cooling liquid introduced into the internal chamber 44 through the inlet 42 is distributed to the cooling passageways 36 through the radially extending parts 46. An annular seal 48 is provided around each cooling passageway 36 between the manifold segment 40 and the adjacent end lamination, i.e., the lamination at the axial end of the stator core 20. The first manifold 22A transfers the compressive loading from the first compression plate 24A to the stator core 20. The manifold segments 40 have radially extending parts 50 (e.g., housing parts, in which the radially extending parts 46 of the internal chamber are formed) that are aligned with the stator teeth 28 and the conventional teeth supports that are normally installed between the compression plates and the stator core can be omitted. Supports 52 can be positioned within the internal chamber 44 to provide additional strength and rigidity to the manifold sections 40.

The second manifold 22B is formed in a similar manner to collect the cooling liquid from the cooling passageways and supply the collected cooling liquid to an outlet in liquid communication with the internal chamber. Although not shown, the first and second manifolds can also have a non-segmented constructions with an annular internal chamber.

The electrical machine includes an external cooling assembly for circulating cooling liquid through the cooling passageways 36.

Figure 7:
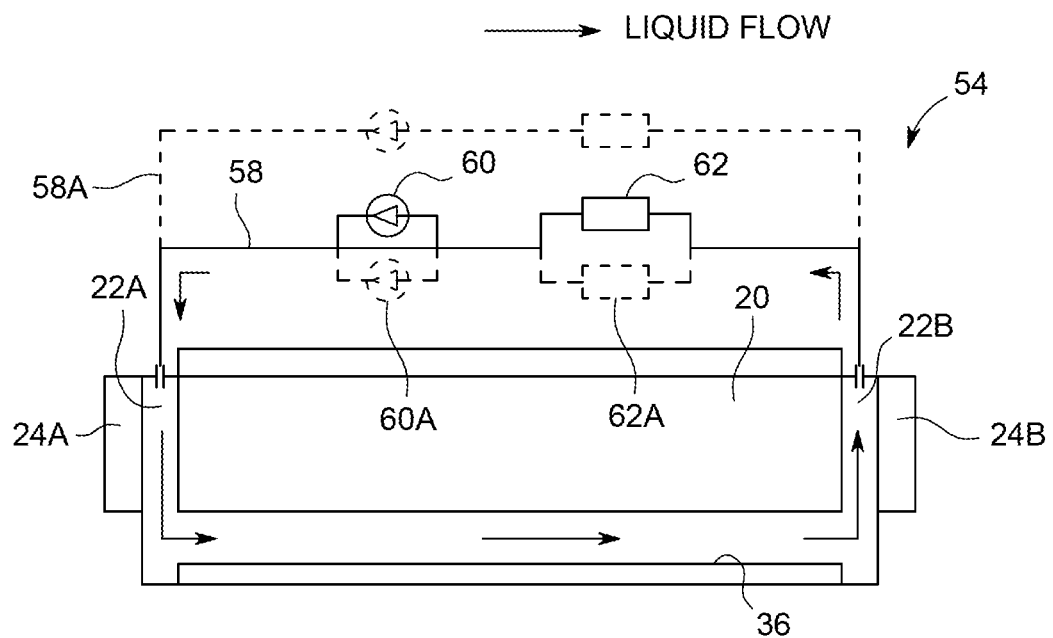
FIG. 7 is a schematic drawing showing how the first and second manifolds are fluidly connected to an external cooling circuit.

The external cooling assembly 54 is shown schematically in FIG. 7 and includes an external cooling circuit 58 that is fluidly connected to the first and second manifolds 22A, 22B. The external cooling assembly 54 includes a pump 60 for circulating the cooling liquid and a heat exchanger 62 for cooling the cooling liquid. The external cooling circuit 58 and the internal cooling passageways 36 together define a closed-loop cooling circuit for the cooling liquid. The external cooling circuit 58 can optionally include second pump 60A and a second heat exchanger 62A for redundancy purposes. A second external cooling circuit 58A can be fluidly connected to the first and second manifolds 22A, 22B in parallel with the external cooling circuit 58.

Figure 8:
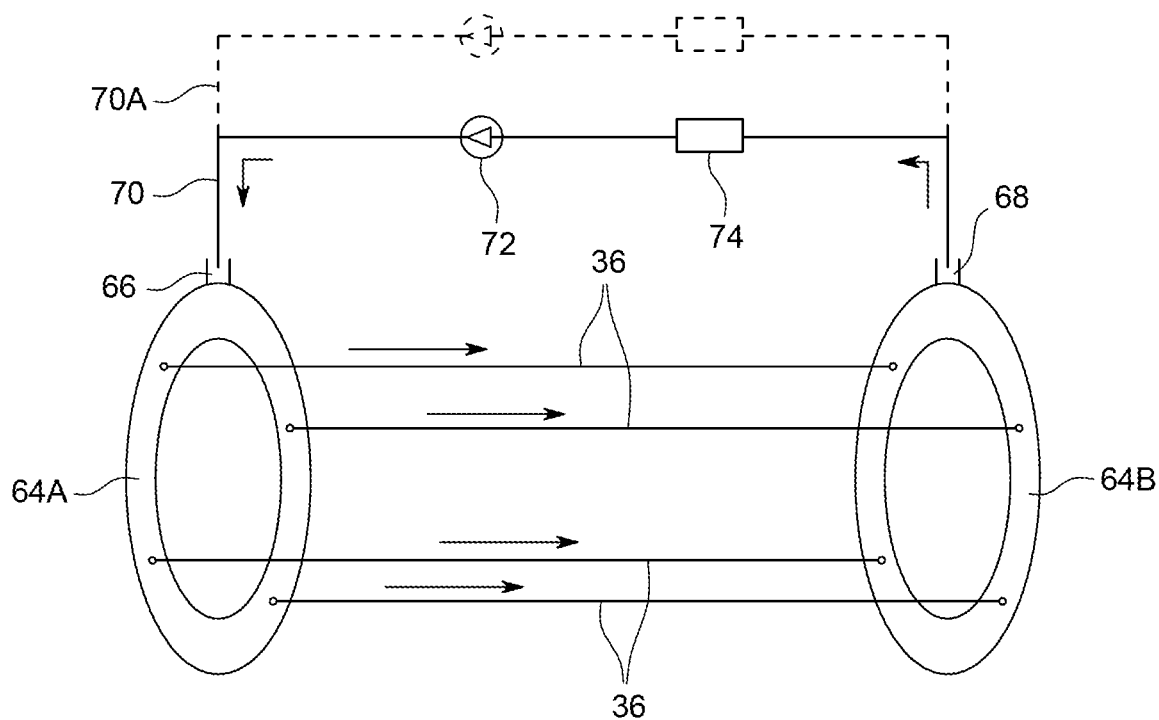
FIG. 8 is a schematic drawing showing a first external cooling circuit where the first and second manifolds are non-segmented.
Figure 9:
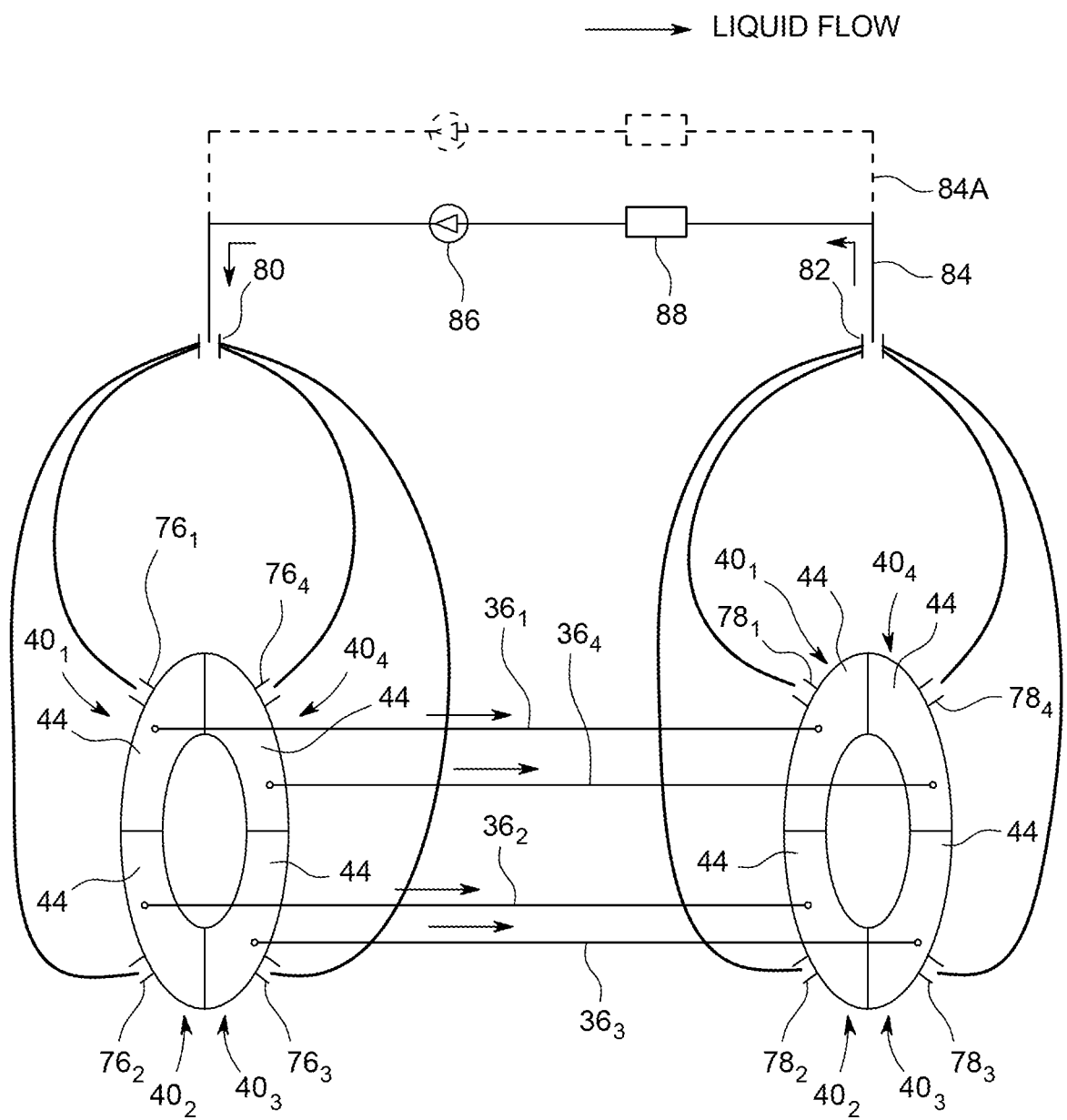
FIG. 9 is a schematic drawing showing a second external cooling circuit where the first and second manifolds are segmented.
Figure 10:
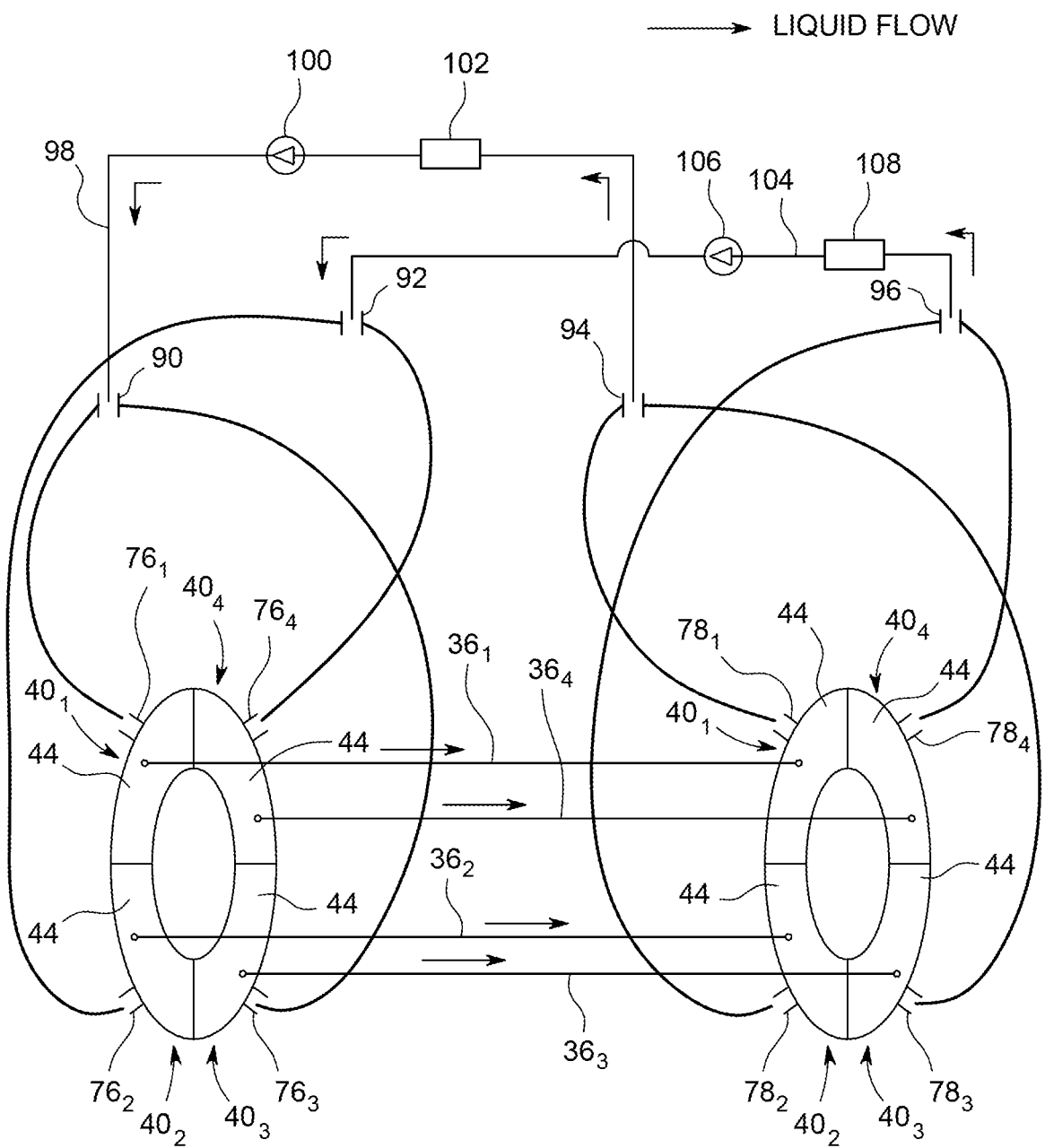
FIG. 10 is a schematic drawing showing a third external cooling circuit where the first and second manifolds are segmented.

Some different options for the external cooling assembly are shown schematically in FIGS. 8 to 10. The external conduits or other pipework of the external cooling assembly are represented in FIGS. 9 and 10 by bold lines.

FIG. 8 shows an arrangement with non-segmented first and second manifolds where each manifold has an annular internal chamber 64A, 64B. The first manifold has an inlet 66 and the second manifold has an outlet 68. The external cooling assembly includes a first external cooling circuit 70 which is fluidly connected to the inlet and outlet 66, 68. The first external cooling circuit 70 includes at least one pump 72 and at least one heat exchanger 74. A second external cooling circuit 70A can optionally be fluidly connected to the inlet and outlet 66, 68 in parallel with the first external cooling circuit 70 for redundancy purposes.

FIG. 9 shows an arrangement with segmented first and second manifolds (e.g., the first and second manifolds 22A, 22B as described above) where each manifold segment $40_1$-$40_4$ has an internal chamber 44. Each manifold segment $40_1$-$40_4$ of the first manifold includes an inlet $76_1$-$76_4$ and each manifold segment of the second manifold includes an outlet $78_1$-$78_4$. The inlets $76_1$-$76_4$ are fluidly connected together in parallel to a common inlet 80 and the outlets $78_1$-$78_4$ are fluidly connected together in parallel to a common outlet 82. The external cooling assembly includes a first external cooling circuit 84 which is fluidly connected to the common inlet and outlet 80, 82. The first external cooling circuit 84 includes at least one pump 86 and at least one heat exchanger 88. A second external cooling circuit 84A can optionally be fluidly connected to the common inlet and outlet 80, 82 in parallel with the first external cooling circuit 84 for redundancy purposes.

FIG. 10 shows an arrangement with segmented first and second manifolds (e.g., the first and second manifolds 22A, 22B as described above) where each manifold segment $40_1$-$40_4$ has an internal chamber 44. The arrangement of FIG. 10 is similar to the arrangement of FIG. 9 and common parts have been given the same reference signs. The inlets $76_1$ and $76_3$ are fluidly connected in parallel to a first common inlet 90 and the inlets $76_2$ and $76_4$ are fluidly connected to a second common inlet 92. The outlet $78_1$ and $78_3$ are fluidly connected in parallel to a first common outlet 94 and the outlets $78_2$ and $78_3$ are fluidly connected to a second common outlet 96. The external cooling assembly includes a first external cooling circuit 98 which is fluidly connected to the first common inlet and outlet 90, 94. The first external cooling circuit 98 includes at least one pump 100 and at least one heat exchanger 102. The external cooling assembly also includes a second external cooling circuit 104 which is fluidly connected to the second common inlet and outlet 92, 96. The second external cooling assembly 104 includes at least one pump 106 and at least one heat exchanger 108. A third external cooling circuit (not shown) can optionally be fluidly connected to the first common inlet and outlet 90, 94 in parallel with the first external cooling circuit 98 for redundancy purposes. Similarly, a fourth external cooling circuit (not shown) can optionally be fluidly connected to the second common inlet and outlet 92, 96 in parallel with the second external cooling circuit 104 for redundancy purposes. It will be readily appreciated that cooling liquid can be circulated through passageways $36_2$ and $36_4$ even if there is a fault with the first external cooling circuit 98. In another arrangement (not shown) each inlet can be fluidly connected to a respective outlet by at least one external cooling circuit, i.e., so that the external cooling assembly includes at least four external cooling circuits.

Figure 11:
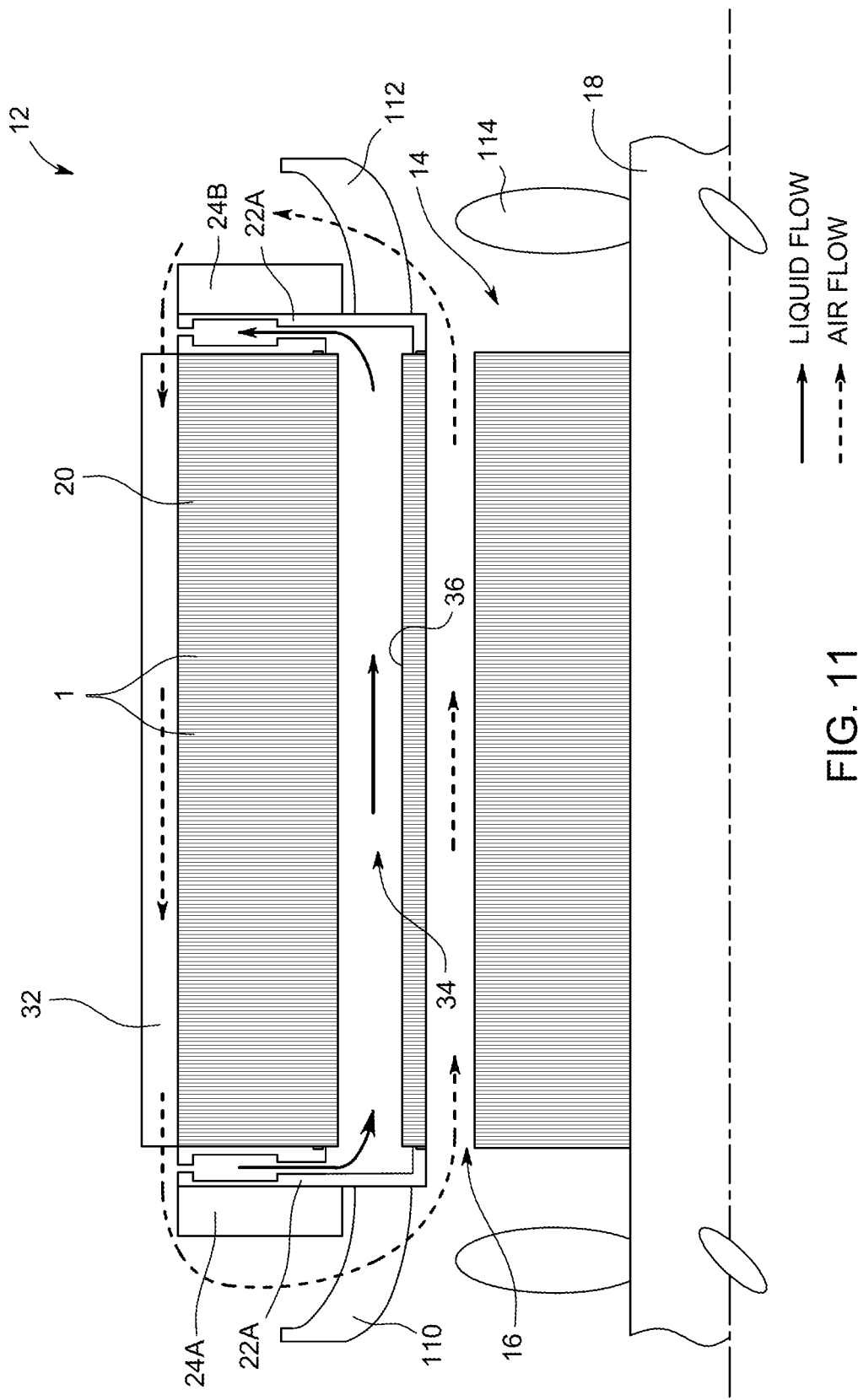
FIG. 11 is an axial cross section through an electrical machine according to embodiments of the present invention showing the air cooling circuit.

The electrical machine also includes an air cooling circuit. With reference to FIG. 11, cooling air (identified by the dashed arrows) can be circulated around the outside of the stator 12. The cooling air can flow over first endwindings 110, through the airgap 16 between the stator core 20 and the rotor 14, over the second endwindings 112, and over the radially outer surface of the stator core where the air is cooled by the cooling fins 32. In other words, the cooling liquid is circulated through the cooling passageways 36 to cool the stator laminations 1, which in turn can cool the circulating air. The cooling air can be circulated by impeller blades 114 mounted to the rotor shaft and directed by baffles (not shown).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator for an electrical machine, comprising:
a plurality of axially adjacent annular laminations forming a stator core, each annular lamination comprising:
a plurality of axially extending stator slots, each stator slot forming a cavity on an inner edge of the annular lamination, the cavity having an opening defined by a bottom of the inner edge, the opening being configured for receiving a conductor of a stator winding; and
a plurality of axially extending stator teeth, each stator tooth of the plurality of stator teeth being adjacent to, and arranged in an alternating fashion with respect to each stator slot; and
an inlet being in fluid communication with an internal chamber within the stator core;
wherein, each stator tooth of the plurality of stator teeth comprises at least one opening that extends through the stator tooth and defines a cooling passageway;
wherein, the internal chamber is in fluid communication with at least two of the cooling passageways; and
wherein, in operation of the electrical machine, a cooling fluid is introduced into the internal chamber via the inlet and distributed through the cooling passageways.

2. The stator according to claim 1, wherein the cooling passageway extends axially.

3. The stator according to claim 1, further comprising cooling fins provided on a radially outer surface of the stator.

4. The stator according to claim 1, wherein the at least one stator tooth of the plurality of stator teeth includes an axially extending void that defines the cooling passageway.

5. The stator according to claim 1, wherein the least one stator tooth of the plurality of stator teeth includes an axially extending void in which a tube of non-electrically conductive material is positioned, and wherein the tube defines the cooling passageway.

6. The stator according to claim 1, further comprising a first manifold at a first axial end of the stator and a second manifold at a second axial end of the stator, wherein the first manifold has at least one inlet in fluid communication with a source of cooling fluid and outlets in fluid communication with a first axial end of the cooling passageway(s) and the second manifold has at least one outlet and inlets in fluid communication with a second axial end of the cooling passageway(s).

7. The stator according to claim 6, wherein the first manifold includes a plurality of manifold segments and/or the second manifold includes a plurality of manifold segments.

8. The stator according to claim 6, wherein further comprising a plurality of first and second compression plates.

9. The stator according to claim 8, wherein the first manifold is positioned between the first compression plate and a first axial end of the stacked laminations and/or the second manifold is positioned between the second compression plate and a second axial end of the stacked laminations.

10. The stator according to claim 9, wherein the first manifold includes one or more supports for transferring the compressive forces between the first compression plate and the first axial end of the stacked laminations and/or wherein the second manifold includes one or more supports for transferring the compressive forces between the second compression plate and the second axial end of the stacked laminations.

11. The stator of claim 1, further comprising a means for circulation the cooling fluid through the cooling passageway to cool the stator.

12. The stator according to claim 11, wherein the means for circulating cooling fluid is an external cooling assembly having one or more external cooling circuits fluidly connected between the first and second manifolds, the external cooling assembly optionally including at least one pump and at least one heat exchanger.

13. The stator of claim 1 further comprising a means for circulating air around the outside of the stator.

14. The stator of claim 13, wherein the air circulates around an air cooling circuit that extends past the radially outer surface of the stator, over the first endwindings, through the stator by extending past the radially inner surface of the stator, and over the second endwindings, wherein the circulated air is cooled by the radially inner surface.

15. A method of cooling an electrical machine comprising:
a stator having a plurality of axially adjacent annular laminations forming a stator core, each annular lamination comprising:
a plurality of axially extending stator slots;
a stator winding comprising (i) a plurality of first endwindings at a first axial end of the stator (ii) a plurality of second endwindings at a second axial end of the stator and (iii) a plurality of conductors, each conductor being received in an opening of a cavity formed by the stator slot on an inner edge of the annular lamination, the opening being defined by a bottom of the inner edge;
a plurality of axially extending stator teeth, each stator tooth of the plurality of stator teeth being adjacent to, and arranged in an alternating fashion with respect to each stator slot; and
an inlet being in fluid communication with an internal chamber within the stator core;
wherein, each stator tooth of the plurality of stator teeth comprises at least one opening that extends through the stator tooth and defines a cooling passageway;
wherein, the internal chamber is in fluid communication with at least two of the cooling passageways; and
wherein, in operation of the electrical machine, a cooling fluid is introduced into the internal chamber via the inlet and distributed through the cooling passageways,
the method comprising:
flowing the cooling fluid through the cooling passageways to cool the stator; and circulating air around the outside of the stator, the air circulating around an air cooling circuit that extends past the radially outer surface of the stator, over the first endwindings, through the stator by extending past the radially inner surface of the stator, and over the second endwindings;
wherein, the circulated air is cooled by the radially inner surface of the stator.

16. The method according to claim 15, further comprising first and second compression plates.

17. The method according to claim 15, wherein the circulated air is cooled by the annular laminations.

18. The method according to claim 15, wherein the least one stator tooth of the plurality of stator teeth includes an axially extending void in which a tube of non-electrically conductive material is positioned, and wherein the tube defines the cooling passageway.

* * * * *